US008688735B2

(12) United States Patent
Raz et al.

(10) Patent No.: US 8,688,735 B2
(45) Date of Patent: Apr. 1, 2014

(54) DETERMINING POTENTIAL RELATIONSHIPS BETWEEN INDIVIDUALS

(71) Applicant: TangoMe, Inc., Palo Alto, CA (US)

(72) Inventors: Uri Raz, Palo Alto, CA (US); Eric Setton, Menlo Park, CA (US)

(73) Assignee: TangoMe, Inc., Mountain View, CA (US)

( * ) Notice: Subject to any disclaimer, the term of this patent is extended or adjusted under 35 U.S.C. 154(b) by 0 days.

(21) Appl. No.: 13/801,626

(22) Filed: Mar. 13, 2013

(65) Prior Publication Data

US 2013/0198287 A1    Aug. 1, 2013

Related U.S. Application Data

(63) Continuation of application No. 13/079,723, filed on Apr. 4, 2011.

(51) Int. Cl.
*G06F 7/00* (2006.01)

(52) U.S. Cl.
USPC .......................................... 707/784

(58) Field of Classification Search
USPC .......................................... 707/784
See application file for complete search history.

(56) References Cited

U.S. PATENT DOCUMENTS

| 7,325,012 | B2 | 1/2008 | Nagy |
| 8,047,544 | B2 | 11/2011 | Sekino |
| 2004/0128322 | A1 | 7/2004 | Nagy |
| 2005/0216300 | A1 | 9/2005 | Appelman et al. |
| 2010/0059922 | A1* | 3/2010 | Sekino .......................... 271/3.18 |

* cited by examiner

*Primary Examiner* — Truong Vo

(57) ABSTRACT

A computer-implemented method for obtaining information corresponding to a first user. The computer-implemented method includes, obtaining information corresponding to a first user, accessing a database comprising information corresponding to a plurality of individuals, based on the information corresponding to a plurality of individuals. The method further includes determining whether a potential relationship exists between a first user and at least one of the plurality of individuals.

20 Claims, 6 Drawing Sheets

DETERMINING POTENTIAL RELATIONSHIPS BETWEEN INDIVIDUALS

CROSS-REFERENCE TO RELATED APPLICATIONS

This patent application is a continuation of and claims the benefit of co-pending U.S. patent application Ser. No. 13/079,723, filed on Apr. 4, 2011, entitled "DETERMINING POTENTIAL RELATIONSHIPS BETWEEN INDIVIDUALS", by Raz et al., assigned to the assignee of the present application, which is incorporated herein by reference in its entirety.

BACKGROUND

Typically, when a user of a system desires to contact an individual though the system, the user obtains the contact information of the individual from the user's address book. However, the address book may not be sufficiently populated. For example, a client device, rarely used or newly used by the user, may not have any information in the address book. Therefore, it is difficult to efficiently communicate with the individual.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In social networks or communication systems, it is desirable to have access to a large relevant list of people to communicate with, follow or be connected to. Creating this access increases the utility of the social networks or communication systems. Moreover, the access improves the overall user experience with the social networks or communication systems.

Oftentimes, a user's address book is not populated or is sparsely populated. For example, a device (e.g., a cell phone) is new to the user and the address book has not been populated. In another example, a device (e.g. a PC, Connect TV environment) does not include a standardized address book or the devices are not synched with all of the contacts.

Moreover, some social networks or communication systems search a user's contact list for other users of the network/system. Additionally, users of the social networks or communication systems may opt out of providing their personal information.

As a result, the access to a large relevant list of people that can be communicated with, followed or connected to is diminished. Thus, the overall user experience with the social networks or communication systems may be negatively affected.

The following discussion will first describe the structure and components of system 100. Then the discussion will describe the functionality of the structure and components of system 100 during use of system 100.

Figure 1:
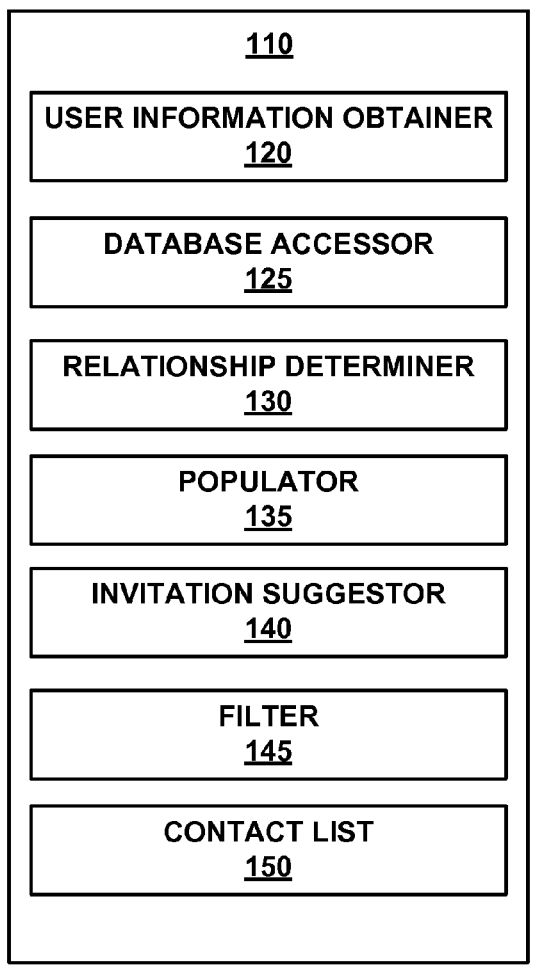
FIG. 1 illustrates an example of a system, in accordance with an embodiment of the present invention.
Figure 1:
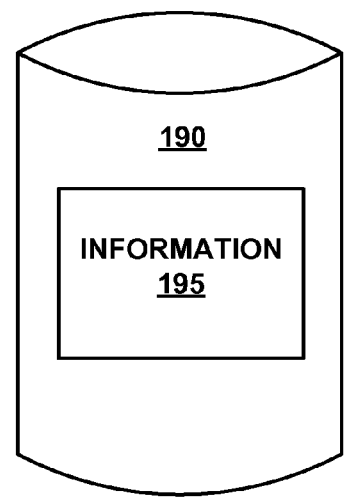
Figure 1:
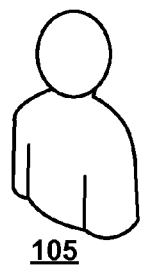

FIG. 1 depicts system 100 comprising device 110 and database 190. System 100 is any network or communication system that allows individuals to communicate with one another. Also, system 100 allows for the access of a large relevant list of people to communicate with, follow or connect to. This access increases the utility of system 100 and increases the overall user experience system 100.

In various embodiments, system 100 can be, but is not limited to, a social network (e.g., Facebook), a communication system (e.g., a mobile device system, a mobile video calling service, etc.).

Database 190 is configured for storing information 195 corresponding to a plurality of individuals. In one embodiment, information 195 corresponds with users of system 100. In another embodiment, information 195 corresponds to individuals who do not use or are not registered with system 100.

In one embodiment, users provide information 195 to system 100 and information 195 is subsequently stored in database 190. The provided information can be, but is not limited to a user's name, telephone number, street address, area code, email addresses, social networking IDs (e.g., Facebook ID), address book, screen name, etc.

Users can also provide information 195 when registering to use system 100. Additionally, users may give access to their address books (e.g., contact lists) which is subsequently stored in database 190. As will be described in detail below, information 195 is utilized to enhance a user's experience of system 100.

Device 110 is any device that is able to facilitate in the communication between users in system 100. For example, device 110 can be, but is not limited to, a personal computer (PC), smart phone, personal digital assistant (PDA), cell phone, hand-held mobile device, any computing device configured for video conferencing between users, etc. In one embodiment, user 105 communicates with another individual through system 100 via device 110.

System 100 also includes user information obtainer 120, database accessor 125, relationship determiner 130, populator 135, invitation suggestor 140, filter 145 and contact list 150. In one embodiment, device 110 includes components 120-150, as depicted in FIG. 1. In another embodiment, device 110 includes some or none of components 120-150. For example, some or all of components 120-150 are disposed in another device, such as a server (not shown).

User information obtainer 120 is configured to obtain information of a user of system 100. Obtained user information can be, but is not limited to, a user's name, telephone number, street address, area code, email addresses, zip code, social networking IDs (e.g., Facebook ID), address book, etc.

Database accessor 125 is configured to accesses database 190 for information 195 corresponding to individuals. The individuals can be other users of system 100 or any individual included in any social graph.

Relationship determiner 130 is configured to determine any potential or possible relationships between user 105 and individuals associated with information 195.

Populator 135 is configured to populate an address book or contact list associated with user 105. In other words, populator 135 facilitates in generating a social graph associated with user 105.

Invitation suggestor 140 is configured for suggesting invitations to use system 100. For example, invitation suggestor 140 is for providing suggested list of individuals to be invited to use system 100.

Filter 145 is configured for filtering a determination of a relationship (or potential relationship) between user 105 and at least one individual associated with information 195. In another embodiment, filter 145 is configured for filtering generated suggested invitations.

Contact list 150 (or address book) is a collection of information corresponding to individuals. In one embodiment, contact list 150 is a social graph of user 105. In general, a social graph describes the relationships between individuals.

Figure 2:
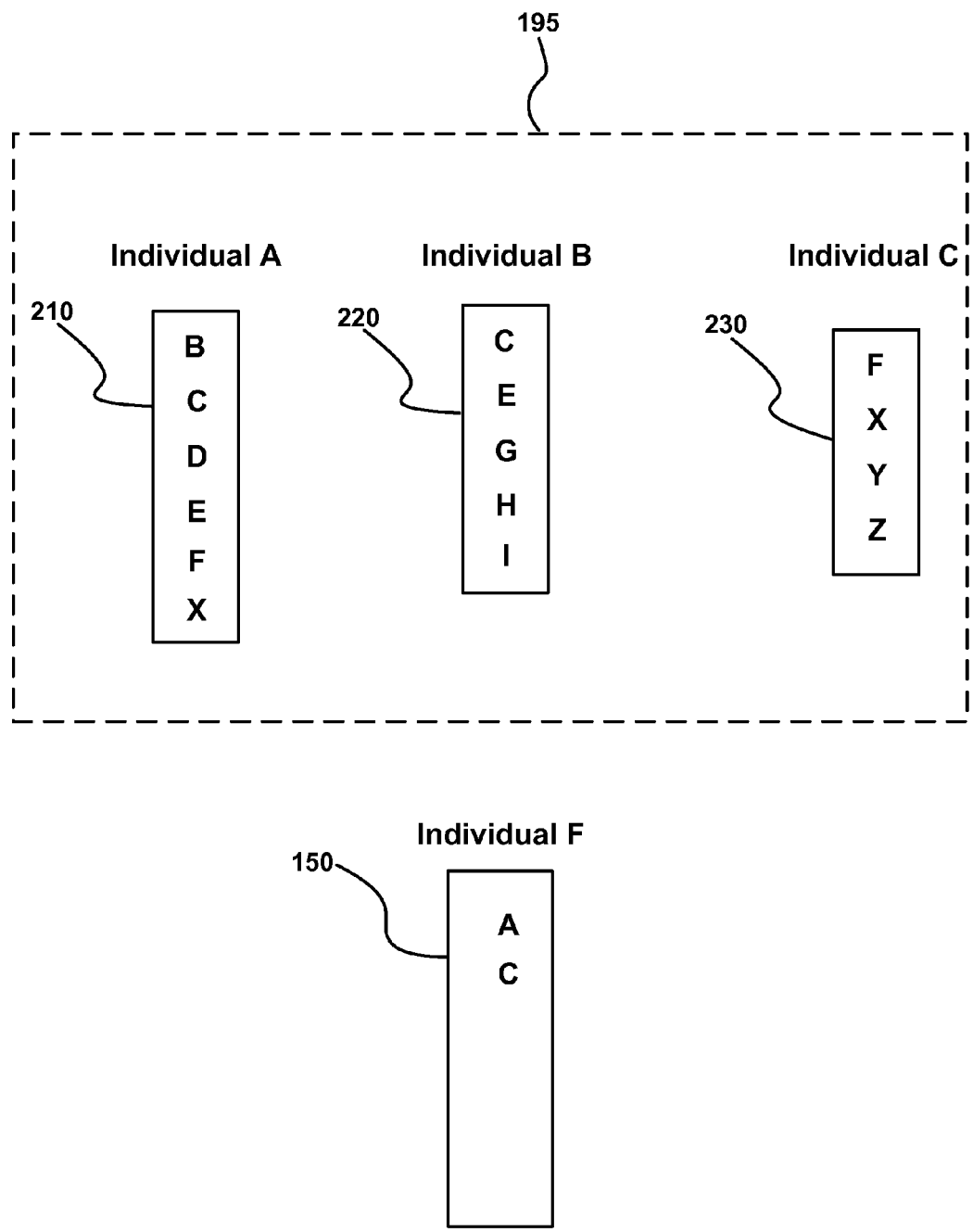
FIG. 2 illustrates an example of information and a contact list, in accordance with an embodiment of the present invention.

The discussion will now describe the functionality of the structure and components of system 100 during use of system 100. In particular, the discussion will describe system 100 that allows for the access of a large relevant list of people to communicate with, follow or connect to. This access increases the utility of system 100 and increases the overall user experience of system 100. The discussion will refer to FIGS. 1 and 2. FIG. 2 depicts an embodiment of contact list 150 and information 195.

In various embodiments, user 105 uses or initiates use with system 100 via device 110. In some embodiments, contact list 150 is initially empty or sparsely populated. This is due to device being a new device or user 105 has not entered any information into contact list 150.

In order to access a large relevant list of people to communicate with, follow or be connected to, user information obtainer 120 obtains information associated with user 105. For example, user information obtainer 120 obtains a phone number of user 105. It should be appreciated that user information obtainer 120 can obtain any information that facilitates in identifying user 105.

In various embodiments, user information obtainer 120 obtains information when user registers or logs into system 100. For example, user 105 inputs, a login name, phone number, Facebook ID, screen name or the like and user information obtainer 120 obtains this information.

Database accessor 125 accesses database 190. Specifically, database accessor 125 accesses information 195 corresponding to a plurality of individuals. As described above, information 195 can be, but is not limited to, a name, telephone number, street address, area code, email addresses, social networking IDs (e.g., Facebook ID), address book, contact list, social graph, etc.

In various embodiments, information 195 is obtained via a Facebook identification (ID). For example, user 105 logs onto a website via a Facebook application interface (API). In other words, a user logs into a website (other than Facebook.com) via Facebook credentials. Accordingly, the Facebook ID of user 105 is obtained and cached, as well as, all of the Facebook ID's of the friends of user 105. Therefore, information 195 includes Facebook IDs of user 105 and/or the friends of user 105.

With reference to FIG. 1, database accessor 125 accesses information 195. In one embodiment, information 195 includes contact lists 210-230. It should be appreciated that information 195 can include any number of contact lists or any information that corresponds to any number of individuals.

As depicted in FIG. 2, Contact list 210 is a contact list of Individual A. Contact list 210 includes information (e.g., cell phone number) corresponding to individuals B, C, D, E, F and X.

Contact list 220 is a contact list of Individual B. Contact list 220 includes information corresponding to individuals C, E, G, H and I.

Contact list 230 is a contact list of Individual C. Contact list 230 includes information corresponding to individuals F, X, Y and Z. It should be appreciated that contact lists 210-230 can include any information corresponding to any number of individuals.

Relationship determiner 130 determines whether a potential relationship exists between user 105 and at least one of the plurality of individuals corresponding to information 195.

For example, relationship determiner 130 determines whether or not a potential relationship exists between Individual F (e.g., user 105) and at least one of Individuals A-C, based on contact lists 210-230, respectively. In such an example, it is determined that there is a relationship between Individual F and both Individual A and Individual C, because contact list 210 includes information (e.g., cell phone number) regarding Individual F and contact list 230 also includes information (e.g., cell phone number) regarding individual F.

Populator 135 populates contact list 150 with information corresponding to at least one of Individuals A-C which are determined to have a relationship with Individual F. For example, contact list 150 (which was initially empty or sparsely populated) is populated with Individual A and Individual C, as depicted in FIG. 2.

Invitation suggestor 140 generates suggested invitations to individuals to utilize system 100.

A user of a network communicates with other individuals, as described above. In some instances, a user of a video calling service interacts with a limited number of people they are particularly close to (e.g., spouses, parents, children, etc.). If individuals that the user interacts with are not registered with the network, then the likelihood the individuals will become active users is reduced. Thus, by inviting the individuals to register with the network, by the user, the likelihood that the individuals will register with the network increases.

In one embodiment, invitation suggestor 140 generates a suggested list of individuals to invite to use or register for services of system 100. In such an embodiment, Individual F (e.g., user 105) is presented with the suggested list of individuals, such as Individuals A and C, because they were determined to have a relationship with Individual F.

In one example, invitation suggestor 140 generates a suggested list that at least includes Individual X because Individual X is within the contact list of Individuals A and C.

In one embodiment, filter 145 filters the results generated by relationship determiner 130. In various embodiments, filter 145 filters based on, but not limited to, first and/or last name, street address, area code, zip code, time zone, international country calling code, call logs (e.g., most recent sent and/or received calls), favorite contacts, etc.

For example, filter 145 filters the potential or possible relationship that is determined between Individual F and individuals A and C. In such an example, filter 145 filters the results based on a last name of Individual F, which is Smith. The last name of Individual A is Smith and the last name of Individual C is Jones. Accordingly, Individual C is filtered out and not populated in contact list 150, while Individual A is not filtered out and is populated in contact list 150 of Individual F.

In another embodiment, filter 145 filters the generated suggested invitations. For example, filter 145 filters the generated list of users to be invited to utilize system 100. In such an example, filter 145 filters the results based on area code. The area code of Individual A is the same area code as Individual F and the area code of Individual C is an area code which is not in the same geographical region as the area code of Individual F. Accordingly, Individual C is filtered out of the generated suggested invitations, while Individual A is not filtered out and remains in the generated suggested invitations.

Database 190 includes an inversion point at which it provides sufficient information for users to access a large relevant list of people that they can communicate with, follow or connect to. Thus, the overall user experience with the social networks or communication systems would be enhanced.

In contrast, if the inversion point is not met, because information 195 is associated with a limited amount of individuals (e.g., tens of people), then database 190 would not be able to provide sufficient information for users to access a large relevant list of people that they can communicate with, follow or connect to. Thus, the overall user experience with the social networks or communication systems may be negatively affected.

FIGS. 3-6 depict embodiments of methods 300-600, respectively. In various embodiments, methods 300-600 are carried out by processors and electrical components under the control of computer readable and computer executable instructions. The computer readable and computer executable instructions reside, for example, in a non-transitory data storage medium such as computer usable volatile and non-volatile memory. However, the computer readable and computer executable instructions may reside in any type of computer readable storage medium. In some embodiments, methods 300-600 are performed by components in system 100, as described in FIGS. 1 and 2.

Figure 3:
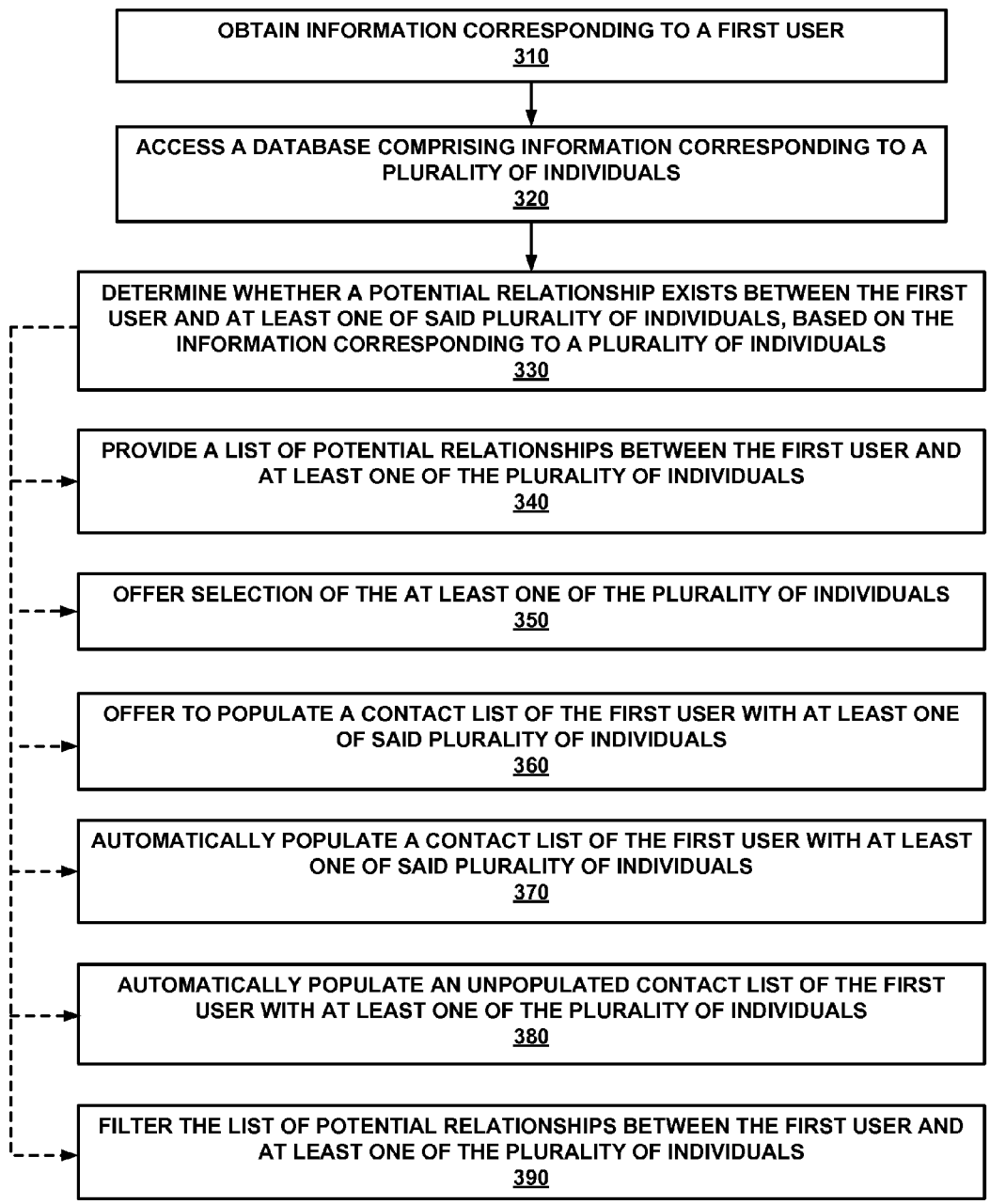
FIG. 3 illustrates an example of a method for determining an association between individuals, in accordance with an embodiment of the present invention.

FIG. 3 depicts an embodiment of a method 300 for obtaining information corresponding to a first user. At 310 of method 300, information corresponding to a first user is obtained. For example, user information obtainer 120 obtains information associated with user 105. The information can be given by user 105 through registering or logging into system 100.

At 320, a database is accessed comprising information corresponding to a plurality of individuals. For example, database 190 is accessed comprising information 195 corresponding to a plurality of individuals, such as Individuals A-C.

It is to be understood that information 195 can be a variety of different information that is obtained by a variety of means. For example, information 195 is a plurality of social graphs associated with a plurality of individuals.

At 330, it is determined whether a potential relationship exists between the first user and at least one of said plurality of individuals, based on the information corresponding to a plurality of individuals. For example, relationship determiner 130 determines whether or not a potential relationship exists between Individual F and any one of Individuals A-C, based on information 195 corresponding to individuals A-C. Specifically, relationship determiner 130 determines that contact lists of Individuals A and C include information (e.g., cell phone number) associated with Individual F. Therefore, a potential relationship exists between Individual F and both Individuals A and C.

At 340, a list of potential relationships between the first user and at least one of the plurality of individuals is provided. For example, a list of Individuals A and C are displayed on a display (not shown) of device 110 and viewed by user 105. Individuals A and C are listed because their respective social graphs include information regarding Individual F.

At 350, selection of the at least one of the plurality of individuals is offered. For example, relationship determiner 130 determines that Individuals A and C have a relationship with Individual F. The results of the determination are presented to Individual F (e.g., displayed on device 110) and Individual F selects whether or not Individuals A and/or C should remain in a generated list of relationships or in a contact list of Individual F.

At 360, population of a contact list of the first user with at least one of the plurality of individuals is offered. For example, population of contact list 150 of user 105 (or Individual F) is offered. Specifically, Individual F is offered to have his contact list 150 populated with Individuals A and C, because it was determined that Individuals A and C have a relationship with Individual F.

At 370, a contact list of the first user is automatically populated with at least one of the plurality of individuals. For example, in response to determination of Individuals A and C having a relationship with Individual F, contact list 150 of Individual F is automatically populated with Individuals A and C and their respective phone numbers.

At 380, automatically populate an unpopulated contact list of the first user with at least one of the plurality of individuals. For example, in response to determination of Individuals A and C having a relationship with Individual F, contact list 150 of Individual F, which is initially unpopulated, is automatically populated with Individuals A and C and their respective phone numbers.

At 390, the list of potential relationships between the first user and at least one of the plurality of individuals is filtered. For example, the generated list of relationship determiner 130 is further filtered by filter 145. Filter 145 filters the list based on a variety of filters, such as area code, zip code, name, etc. In such an example, filter 145 filters out Individual A because the zip code of Individual A is a great distance away from the zip code of Individual F.

Figure 4:
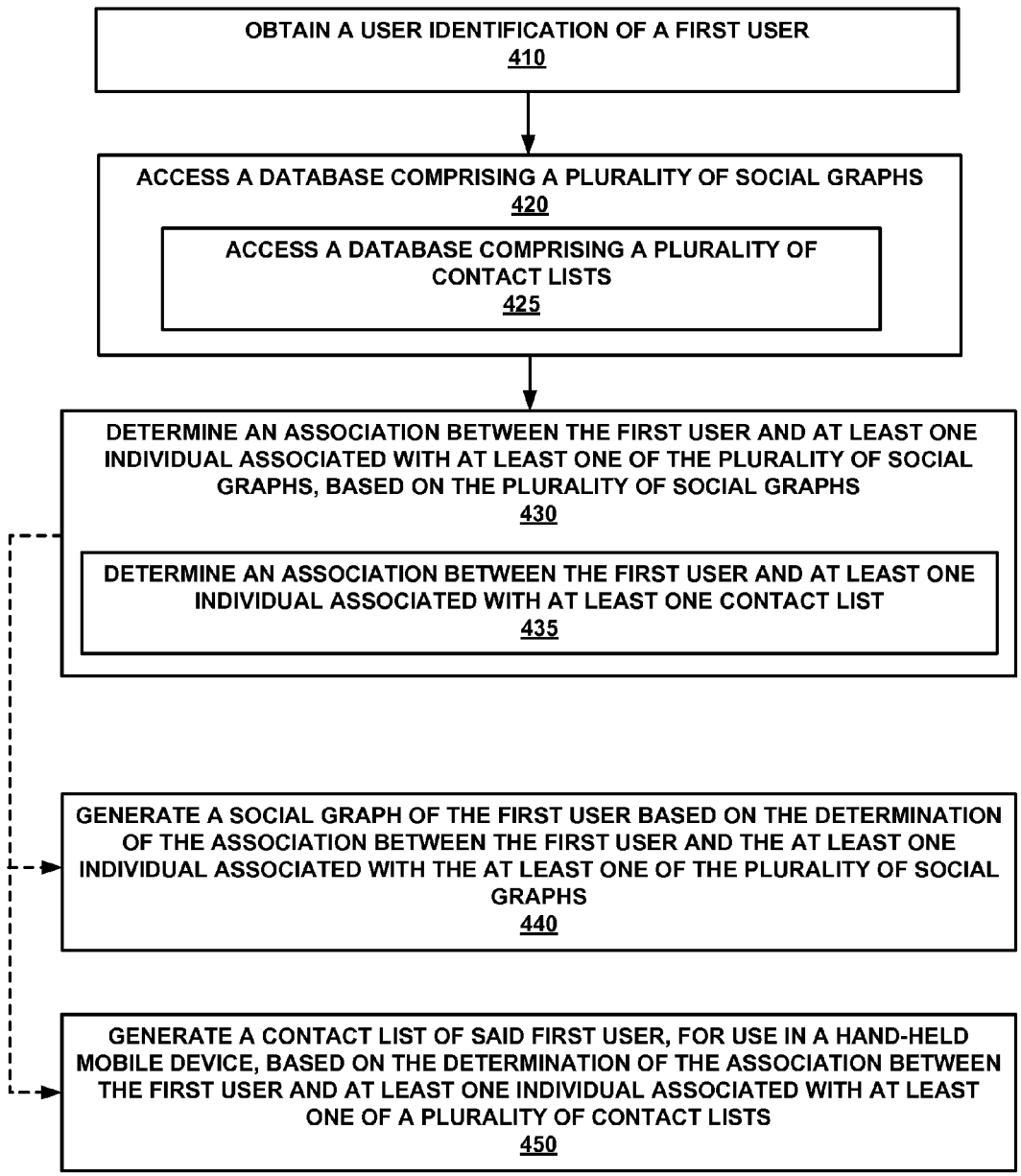
FIG. 4 illustrates an example of a method for obtaining information corresponding to a first user, in accordance with an embodiment of the present invention.

FIG. 4 depicts an embodiment of a method 400 for determining an association between individuals. At 410 of method 400, user identification of a user is obtained. For example, Individual F logs into or registers with system 100 by providing his name. It should be appreciated that user identification can be any information that facilitates in identifying the user.

At 420, a database comprising a plurality of social graphs is accessed. For example, database accessor 125 accesses social graphs of a plurality of individuals. The social graphs can be any format that facilitates in determining relationships between individuals.

In one embodiment, at 425, a database comprising a plurality of contact lists is accessed. For example, database accessor 125 accesses database 190 that includes individual's contact lists. The contact lists can be in any format and be accessed from any device (e.g., a cell phone, PC).

At 430, an association between the first user and at least one individual associated with at least one of the plurality of social graphs is determined, based on the plurality of social graphs. For example, relationship determiner 130 determines a relationship between individuals whose information is located within a contact list or between individuals whose contact list contains information associated with user 105.

In one embodiment, at 435, an association between the first user and at least one individual associated with at least one contact list is determined. For example, an association between Individual F and Individual X is determined based on information of stored in the contact lists of Individuals A and C. In another example, an association between Individual F and Individual E is determined, because Individual E has the same area code and zip code as Individual F.

At 440, a social graph of the first user based on the determination of the association between the first user and the at least one individual associated with the at least one of the plurality of social graphs is determined. For example, a relationship between Individual F and Individuals A and C is determined. Therefore, a social graph is determined for Individual F.

At 450, a contact list of the first user, is generated, for use in a hand-held mobile device, based on the determination of the association between the first user and at least one individual associated with at least one of a plurality of contact lists. For example, contact list 150 is generated (which includes Individuals A and C) for use at device 110, based on the determination of the association between Individual F and Individuals A and C.

Figure 5:
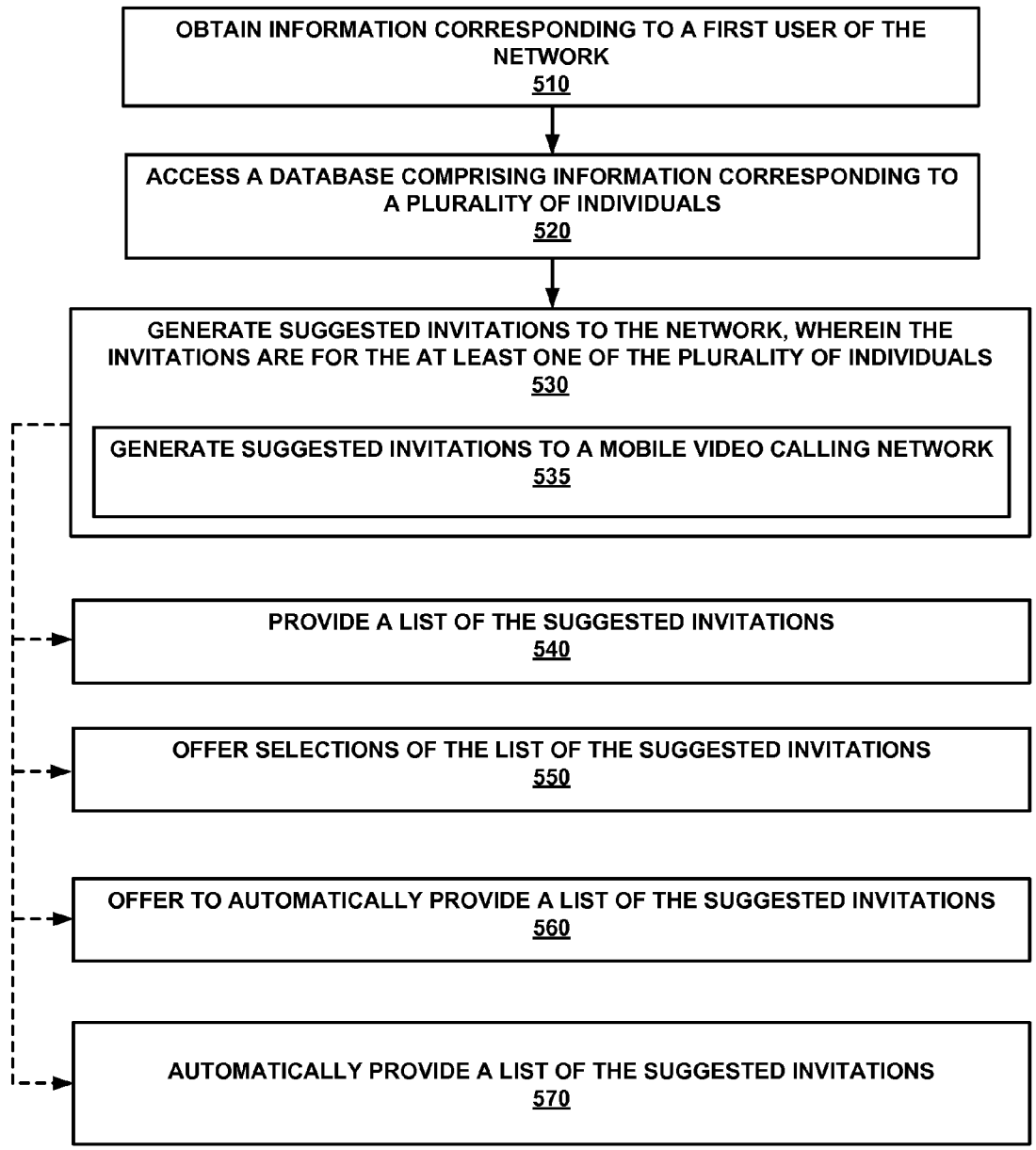
FIG. 5 illustrates an example of a method for suggesting invitations to a network, in accordance with an embodiment of the present invention.

FIG. 5 depicts an embodiment of a method 500 for suggesting invitations to a network. At 510 of method 500, information corresponding to a first user is obtained. For example, a name of user 105 is obtained.

At 520, a database is accessed comprising information corresponding to a plurality of individuals. For example, database 190 is accessed. Database 190 can include information associated with millions of individuals.

At 530, suggested invitations to the network are generated, wherein the invitations are for the at least one of the plurality of individuals. For example, a list of users to invite to register or use system 100 is generated by invitation generator 140. The invitations are for individuals who are determined to have a relationship with user 105. As such, the invitations are for Individuals A and C and are to be sent from Individual F.

In one embodiment, at 535, suggested invitations to a mobile video calling network are generated. For example, system 100 is a mobile video calling network that allows for individuals to video call one another. Accordingly, invitation suggester 140 generates suggested invitations to system 100.

At 540, a list of the suggested invitations is provided. For example, the generated suggested invitations is provided in a list to user 105. In particular, the suggested invitations are displayed as a list to user 105 on device 110.

At 550, selections of the list of the suggested invitations are offered. For example, user 105 is presented with the list of the suggested invitations. User 105 can select which of individuals listed are to be invited or not invited to utilize system 100.

At 560, a list of the suggested invitations are offered to be automatically provided. For example, user 105 is prompted whether or not the list of suggested invitations are to be automatically sent to the individuals.

At 570, a list of the suggested invitations are automatically provided. For example, the invitations suggested by invitation suggestor 140 are automatically sent to the individuals listed.

Figure 6:
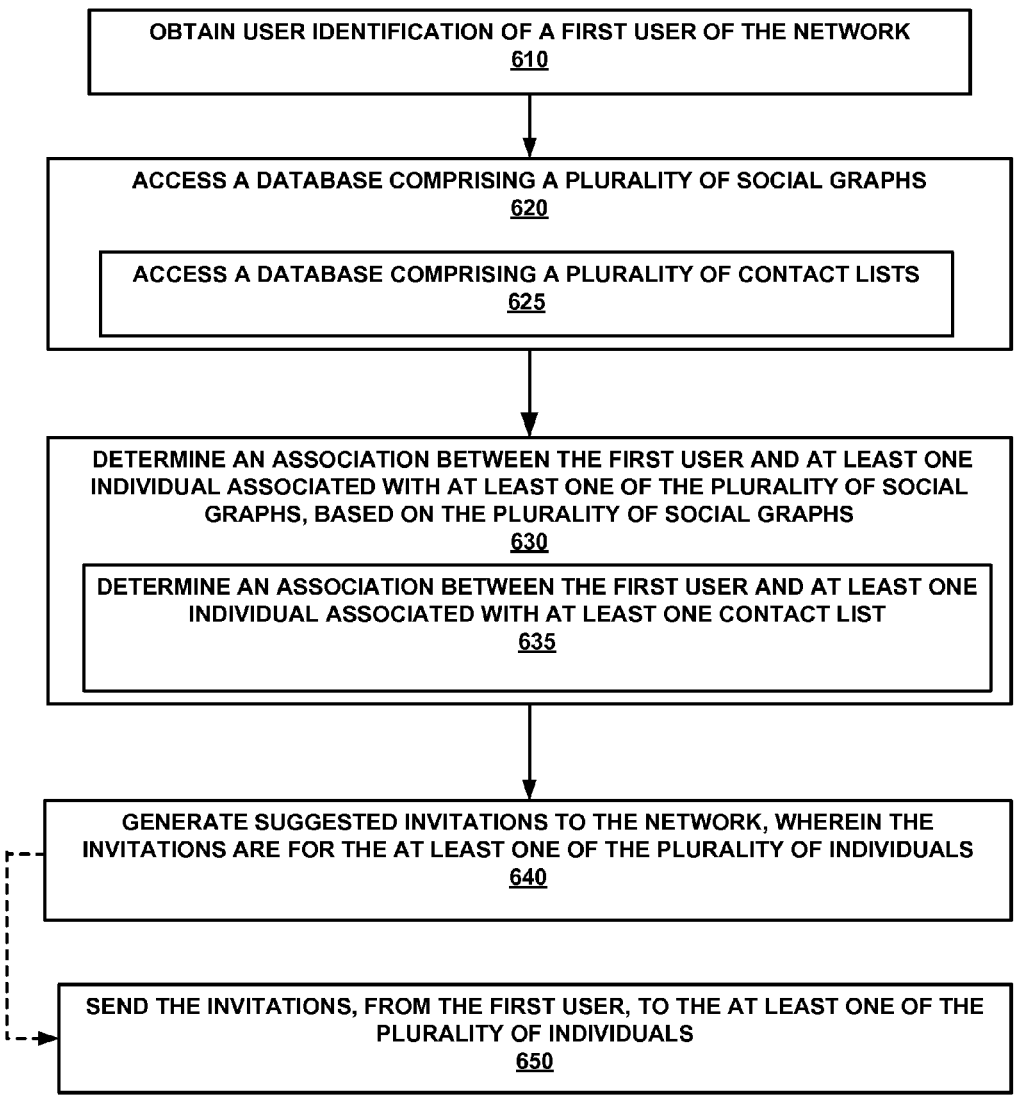
FIG. 6 illustrates an example of a method for suggesting invitations to a network, in accordance with an embodiment of the present invention.

FIG. 6 depicts an embodiment of a method 500 for suggesting invitations to a network. At 610 of method 600, user identification of a first user of the network is obtained. For example, the first and last name of user 105 is obtained.

At 620, a database comprising a plurality of social graphs is accessed. In one embodiment, at 625, a database comprising a plurality of contact lists is accessed.

At 630, an association between the first user and at least one individual associated with at least one of the plurality of social graphs is determined, based on the plurality of social graphs. In one embodiment, at 635, an association between the first user and at least one individual associated with at least one contact list is determined.

At 640, suggested invitations to the network are generated, wherein the invitations are for the at least one of the plurality of individuals. For example, a suggested invitation to Individual E is generated, because Individual E has the same last name and the same zip code as Individual F.

At 650, the invitations are sent from the first user to the at least one of the plurality of individuals. For example, invitations to utilize system 100 is sent from Individual F to Individual E, because it was determined that there was an associate between the individuals. In various embodiments, the invitations can be sent via email, promotional email (e.g., newsletters, announcements, etc.)

Various embodiments of the present invention are thus described. While the present invention has been described in particular embodiments, it should be appreciated that the present invention should not be construed as limited by such embodiments, but rather construed according to the following claims.

The invention claimed is:

1. A computer-implemented method for obtaining information corresponding to a first user of a system, said computer-implemented method comprising:

obtaining information corresponding to a first user of a system, wherein said information is received through at least one of a registration in and a logging into said system;

accessing a database of said system, wherein said database comprises information corresponding to at least one individual of a plurality of individuals, wherein said at least one individual of said plurality of individuals is at least one of a second user of said system and included in any social graph, wherein a portion of said information corresponding to said at least one individual is received from a source other than a user of said system, and wherein a potential relationship between said first user and each individual of said plurality of individuals may be determined even if said each individual is not a user of said system and is not registered with said system, wherein said database comprises an inversion point, a predetermined value of which being met signifying that said database provides sufficient information for at least said user to access a sufficiently large relevant list of people with which to at least one of communicate, follow, and connect, wherein said sufficiently large relevant list of people comprises a predetermined quantity of said people; and based on said obtained information corresponding to said first user and said information corresponding to said at least one individual, determining whether a potential relationship exists between said first user and said at least one individual.

2. The computer-implemented method of claim 1, further comprising:
providing a list of said set of potential relationships.

3. The computer-implemented method of claim 2, further comprising:
offering a selection of said at least one individual of said plurality of individuals.

4. The computer-implemented method of claim 2, further comprising:
filtering said list of potential relationships between said first user and said at least one individual of said plurality of individuals.

5. The computer-implemented method of claim 1, further comprising:
offering to populate a contact list on a device of said first user with at least one individual of said plurality of individuals.

6. The computer-implemented method of claim 1, further comprising:
automatically populating a contact list of said first user with at least one individual of said plurality of individuals.

7. The computer-implemented method of claim 1, further comprising:
automatically populating an unpopulated contact list of said first user with at least one individual of said plurality of individuals.

8. A computer-implemented method for determining an association between individuals, said computer-implemented method comprising:
obtaining user identification of a first user of a system, wherein said user identification is received through at least one of a registration in and a logging into a system;
accessing a database of said system, wherein said database comprises:
a plurality of social graphs; and
information corresponding to at least one individual of a plurality of individuals, wherein said at least one individual of said plurality of individuals is at least one of a second user of said system and included in any social graph of said plurality of social graphs, wherein a portion of said information corresponding to said at least one individual is received from a source other than a user of said system, and wherein a potential relationship between said first user and each individual of said plurality of individuals may be determined even if said each individual is not a user of said system and is not registered with said system, wherein said database comprises an inversion point, a predetermined value of which being met signifying that said database provides sufficient information for at least said user to access a sufficiently large relevant list of people with which to at least one of communicate, follow, and connect, wherein said sufficiently large relevant list of people comprises a predetermined quantity of said people; and
based on said plurality of social graphs, determining an association between said first user and said at least one individual associated with at least one social graph of said plurality of social graphs.

9. The computer-implemented method of claim 8, wherein said user identification is selected from a group consisting of: phone number, street address, zip code, email address, area code, and a Facebook ID.

10. The computer-implemented method of claim 8, wherein said accessing a database of said system further comprises:
accessing a database comprising a plurality of contact lists.

11. The computer-implemented method of claim 8, wherein said determining an association between said first user and said at least one individual associated with at least one of said plurality of social graphs further comprises:
determining an association between said first user and at least one individual of said plurality of individuals associated with at least one contact list.

12. The computer-implemented method of claim 8, further comprising:
generating a social graph of said first user based on said determining an association between said first user and said at least one individual associated with said at least one social graph of said plurality of social graphs.

13. The computer-implemented method of claim 8, further comprising:
generating a contact list of said first user, for use in a hand-held mobile device, based on said determining of said association between said first user and at least one individual associated with at least one contact list of a plurality of contact lists.

14. A computer-implemented method for suggesting invitations to a network, said computer-implemented method comprising:
obtaining information corresponding to a first user of said network, wherein said information is obtained through a receipt from said first user during at least one of a registration in and a logging into a system of said first user;
accessing a database of said system, wherein said database comprises information corresponding to at least one individual of a plurality of individuals, wherein said at least one individual of said plurality of individuals is at least one of a second user of said system and included in any social graph, wherein a portion of said information corresponding to said at least one individual is received from a source other than a user of said system, and wherein a potential relationship between said first user and each individual of said plurality of individuals may be determined even if said each individual is not a user of said system and is not registered with said system, wherein said database comprises an inversion point, a predetermined value of which being met signifying that said database provides sufficient information for at least said user to access a sufficiently large relevant list of people with which to at least one of communicate, follow, and connect, wherein said sufficiently large relevant list of people comprises a predetermined quantity of said people;
based on said obtained information corresponding to said first user and said information corresponding to said at least one individual, determining whether a potential relationship exists between said first user and said at least one individual; and
generating suggested invitations to said network, wherein said invitations are for said at least one individual of said plurality of individuals.

15. The computer-implemented method of claim 14, wherein said generating suggested invitations to said network comprises:
generating suggested invitations to a mobile video calling network.

16. The computer-implemented method of claim 14, further comprising:
providing a list of said suggested invitations.

17. The computer-implemented method of claim 16, further comprising:
offering selections of said list of said suggested invitations.

18. The computer-implemented method of claim 14, further comprising:
offering to automatically provide a list of said suggested invitations.

19. The computer-implemented method of claim 14, further comprising:
automatically providing a list of said suggested invitations.

20. A computer-implemented method for suggesting invitations to a network, said computer-implemented comprising:
obtaining user identification of a first user of said network, wherein said user identification is received through at least one of a registration in and a logging into a system of said first user;
accessing a database of said system, wherein said database comprises:
a plurality of social graphs; and
information corresponding to at least one individual of a plurality of individuals, wherein said at least one individual of said plurality of individuals is at least one of a second user of said system and included in any social graph of said plurality of social graphs, wherein a portion of said information corresponding to said at least one individual is received from a source other than a user of said system, and wherein a potential relationship between said first user and each individual of said plurality of individuals may be determined even if said each individual is not a user of said system and is not registered with said system, wherein said database comprises an inversion point, a predetermined value of which being met signifying that said database provides sufficient information for at least said user to access a sufficiently large relevant list of people with which to at least one of communicate, follow, and connect, wherein said sufficiently large relevant list of people comprises a predetermined quantity of said people;
based on said plurality of social graphs, determining an association between said first user and said at least one individual associated with at least one social graph of said plurality of social graphs; and
generating suggested invitations to said network, wherein said invitations are for said at least one individual of said plurality of individuals.

* * * * *